United States Patent
Rommel et al.

(10) Patent No.: US 10,732,941 B2
(45) Date of Patent: Aug. 4, 2020

(54) VISUAL FACET COMPONENTS

(71) Applicant: SAP SE, Walldorf (DE)

(72) Inventors: Roman Rommel, Neustadt an der Weinstrasse (DE); Vladimir Shapiro, Sinsheim (DE); Daniel Wurst, Karlsruhe (DE)

(73) Assignee: SAP SE, Walldorf (DE)

( * ) Notice: Subject to any disclaimer, the term of this patent is extended or adjusted under 35 U.S.C. 154(b) by 110 days.

(21) Appl. No.: 16/038,912

(22) Filed: Jul. 18, 2018

(65) Prior Publication Data

US 2020/0026500 A1    Jan. 23, 2020

(51) Int. Cl.
| | |
|---|---|
| *G06F 3/048* | (2013.01) |
| *G06F 8/38* | (2018.01) |
| *G06T 11/20* | (2006.01) |
| *G06F 3/0484* | (2013.01) |
| *G06F 40/14* | (2020.01) |

(52) U.S. Cl.
CPC .............. *G06F 8/38* (2013.01); *G06F 3/04845* (2013.01); *G06F 40/14* (2020.01); *G06T 11/206* (2013.01)

(58) Field of Classification Search
CPC .................................................. G06F 3/04845
USPC ........................................................ 715/762
See application file for complete search history.

(56) References Cited

U.S. PATENT DOCUMENTS

| | | | |
|---|---|---|---|
| 6,253,193 B1 * | 6/2001 | Ginter | G06F 21/10 348/E5.006 |
| 6,948,070 B1 * | 9/2005 | Ginter | G06F 21/10 348/E5.006 |
| 7,692,653 B1 * | 4/2010 | Petro | G06T 11/20 345/440 |
| 9,021,351 B2 * | 4/2015 | Takekawa | G06F 3/04845 358/1.15 |
| 9,424,670 B1 * | 8/2016 | Jin | G06T 11/206 |
| 10,318,253 B2 * | 6/2019 | Jann | G06F 8/35 |
| 2011/0074824 A1 * | 3/2011 | Srinivasan | G06F 3/04883 345/660 |
| 2016/0334974 A1 * | 11/2016 | Gray | G06T 11/206 |
| 2017/0139574 A1 * | 5/2017 | Dong | G06F 3/04845 |
| 2018/0129368 A1 * | 5/2018 | Cheung | G06F 3/0482 |

* cited by examiner

*Primary Examiner* — William D Titcomb
(74) *Attorney, Agent, or Firm* — Sterne, Kessler, Goldstein & Fox P.L.L.C.

(57) ABSTRACT

Disclosed herein are system, method, and computer program product embodiments for implementing facet components and facet collection components for dynamic switching between display contexts. An embodiment operates by presenting, via a first rendering component, a first graphical representation of a numeric component in a first display context within a graphical user interface, determining a second display context associated with the numeric component, and loading a second rendering component associated with the second display context into the numeric component. Further, the embodiment presents, via the second rendering component, a second graphical representation of the numeric component in the second display context within the graphical user interface.

20 Claims, 11 Drawing Sheets

FIG. 3A

Text Label 308    Numeric Collection 300
                 Comp. 302

Product Suppliers by Delivery Time:

| | Numeric Comps. 304(1)-(4) |
|---|---|
| Polaris Lights | 10 Days |
| Roboid United Ltd. | 10 Days |
| Coash | 10 Days |
| Battle Whitley | 21 Days |

| Suppliers | Delivery Time |
|---|---|
| ☐ Polaris Lights | 10.00 Days |
| ☐ Roboid United Ltd. | 10.00 Days |
| ☐ Battle Whitley | 21.00 Days |
| ☐ Coash | 10.00 Days |
| ☐ Zytrex Corp. | 21.00 Days |
| ☐ Benita Sanford | 21.00 Days |
| ☐ Rodeomad Corp. | 21.00 Days |

Numeric Components 306(1)-(7)

FIG. 3B

Numeric Collection 300
Comp. 302

Product Suppliers by Delivery Time:

| Polaris Lights | 10 Days |
|---|---|
| Roboid United Ltd. | 10 Days |
| Coash | 10 Days |
| Battle Whitley | 21 Days |

| Suppliers | Delivery Time |
|---|---|
| ☐ Polaris Lights | 10.00 Days |
| ☐ Roboid United Ltd. | 10.00 Days |
| ☐ Battle Whitley | 21.00 Days |
| ☐ Coash | 10.00 Days |
| ☐ Zytrex Corp. | 21.00 Days |
| ☐ Benita Sanford | 21.00 Days |
| ☐ Rodeomad Corp. | 21.00 Days |

Numeric Component 306(7)

FIG. 3C

Numeric Collection Comp. 302 — 300

Numeric Component 306(7)

Product Suppliers by Delivery Time:
- Polaris Lights — 21.00 Days / 10 Days
- Roboid United Ltd. — 10 Days
- Coash — 10 Days
- Battle Whitley — 21 Days

| | Suppliers | Delivery Time |
|---|---|---|
| ☐ | Polaris Lights | 10.00 Days |
| ☐ | Roboid United Ltd. | 10.00 Days |
| ☐ | Battle Whitley | 21.00 Days |
| ☐ | Coash | 10.00 Days |
| ☐ | Zytrex Corp. | 21.00 Days |
| ☐ | Benita Sanford | 21.00 Days |
| ☐ | Rodeomad Corp. | 21.00 Days |

FIG. 3D

Updated Numeric Collection Component 310 — 300

Product Suppliers by Delivery Time:
- Polaris Lights — 10 Days
- Roboid United Ltd. — 10 Days
- Coash — 10 Days
- Battle Whitley — 21 Days
- Rodeomad Corp. — 21 Days

| | Suppliers | Delivery Time |
|---|---|---|
| ☐ | Polaris Lights | 10.00 Days |
| ☐ | Roboid United Ltd. | 10.00 Days |
| ☐ | Battle Whitley | 21.00 Days |
| ☐ | Coash | 10.00 Days |
| ☐ | Zytrex Corp. | 21.00 Days |
| ☐ | Benita Sanford | 21.00 Days |
| ☐ | Rodeomad Corp. | 21.00 Days |

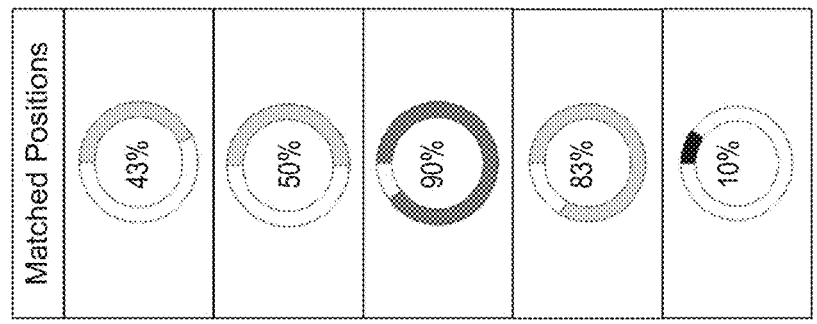
FIG. 8C
FIG. 8A
FIG. 8B

VISUAL FACET COMPONENTS

BACKGROUND

Typically, developers and front-end designers decide how information will be viewed within an application during the development process. For example, a front-end designer must decide which graphic controls will be used to view a numeric value displayed in a graphical user interface during the development process. However, developers and front-end designers cannot be expected to predict the optimal or preferred visualization modes for all information displayed in an application. Further, developers and front-end designers cannot possibly account for yet created visualization modes.

BRIEF DESCRIPTION OF THE DRAWINGS

The accompanying drawings are incorporated herein and form a part of the specification.

FIGS. 3A-3D depict an example graphical user interface for dynamically adding a facet component to a facet collection component, according to some embodiments.

FIGS. 8A-8G depict example graphical user interfaces illustrating display contexts according to embodiments of the present disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1A:
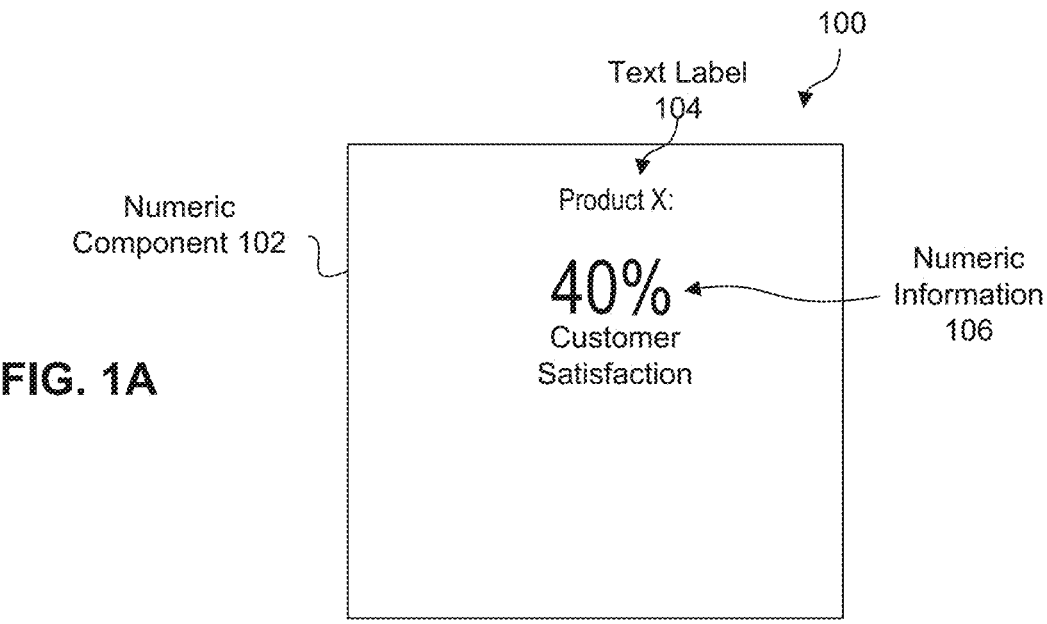
FIGS. 1A-1C depict an example graphical user interface for dynamic switching between display contexts of a facet component, according to some implementations, according to some embodiments.

FIG. 1A illustrates a graphical user interface (GUI) 100 presenting a graphical representation of an original numeric component 102. In some embodiments, GUIs provide a visual interface or front-end to a software application or web application. Some examples of an application may include computer programs, webpages, software apps, hybrid software apps, distributed applications, etc. Further, GUIs provide visual elements which simplify the way the user interacts with an application. As an example, the application presenting the GUI 100 may be a web application programmed to track product information.

As illustrated in FIG. 1, the original numeric component 102 causes displays of information about a product of interest to a user. As described in detail herein, the numeric component 102 is a visual control that may be added to the application code of an application. As used herein, application code refers to a collection of computer instructions written using a programming language.

In some embodiments, the numeric component 102 may be added to the source code during development by a developer or front-end designer. The numeric component 102 may be added or configured by an administrator of the application post development. Further, the numeric component 102 may dynamically implement a plurality of visual forms without manual implementation on part of the developer, front-end designer, and/or administrator. In other words, a developer, front-end designer, and/or administrator would not have to program the numeric component 102 to implement each of the plurality of visual forms within the GUI 100.

In some embodiments, the visual forms may include pill display context, rating indicator context, progress bar context, microchart context, or key performance indicator (KPI) context. Additionally, the numeric component 102 may be displayed in another visual form within the GUI 100 based upon a selection of a user, configuration by an administrator, one or more attributes of the numeric component 102, one or more attributes of the data presented by the numeric component 102, usage history of numeric component 102, or one or more attributes of the user of GUI 100.

As illustrated in FIG. 1A, the graphical representation of the original numeric component 102 presents a text label 104 indicating that the numeric component 102 provides sales information about "Product X", and numeric information 106 indicating the customer satisfaction rating of the "Product X." Referring to FIG. 1A, the graphical representation of original numeric component 102 is presented to the user in the GUI 100 according to a first visual context. In particular, the numeric component 102 is presented according to a KPI context. However, the user may endeavor to view the numeric component 102 according to a second visual context.

Figure 1B:
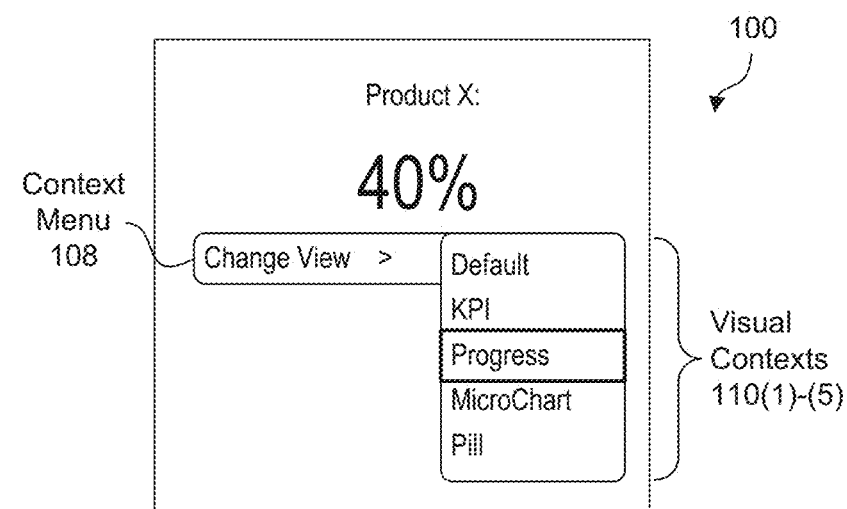

FIG. 1B illustrates the graphical user interface 100 including the graphical representation of the original numeric component 102 and a context menu 108. Further, a user may employ the context menu 108 to select a second visual context for viewing the numeric information 106. For example, the user may prefer to view the numeric component 102 in a progress bar context instead of the KPI context. As such, the user may trigger presentation of the context menu 108 which presents a plurality of visual contexts 110(1)-(5) supported by the numeric component 102. In some embodiments, the visual contexts 110 displayed within the context menu 108 may be determined based upon one or more attributes of the numeric component 102. For instance, one or more visual contexts 110 for displaying percentage information may be presented in the context menu 108 based on the numeric component 102 indicating that the numeric information 106 is a percentage value.

Additionally, the user may employ an input device to select a new visual context from the plurality of visual contexts 110(1)-(5) presented in the context menu 108. Although FIG. 1B illustrates that the context menu 108 may include drop down menu comprising the plurality of visual contexts 110(1)-(5), the context menu 108 may also include input fields, radio buttons, checkboxes, scrolling panels, or any other method of user selection within a GUI of a computing device. Additionally, or alternatively, the user may use a keyboard shortcut or any other digital input means to select a new visual context.

Figure 1C:
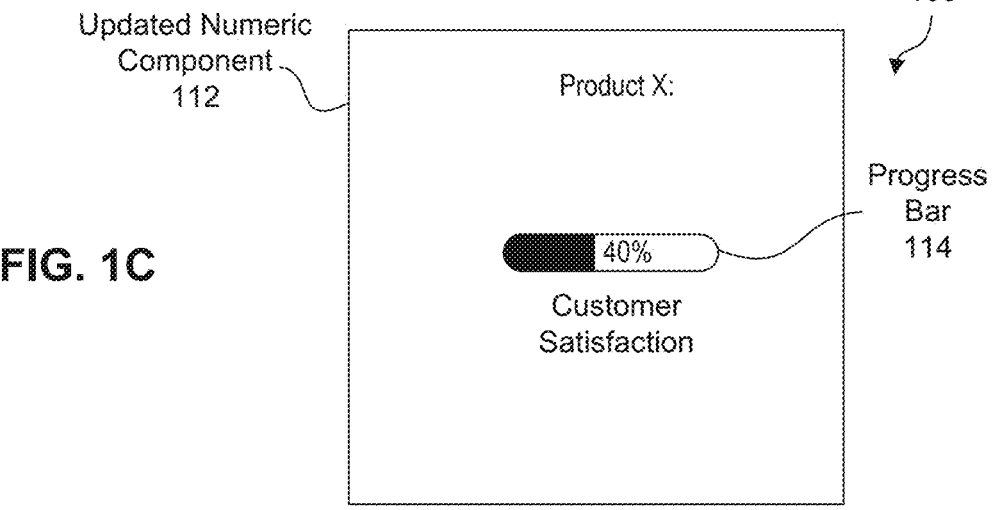

FIG. 1C illustrates the graphical user interface 100 including a graphical representation of an updated numeric component 112. As illustrated in FIG. 1C, the selection of the new visual context causes the graphical representation of the original numeric component 102 displayed according to the KPI context to be replaced with a graphical representation of the updated numeric component 112 displayed according to the progress bar context. In the progress bar context, the updated numeric component 112 presents the numeric information 106 using the progress bar 114. In some embodiments, the user may prefer to view percentage information using the progress bar 114. Once the progress bar 114 is displayed, the user may determine whether to order more of "Product X" in view of the progress bar 114 indicating that only 40% of customers were satisfied with "Product X."

Figure 2A:
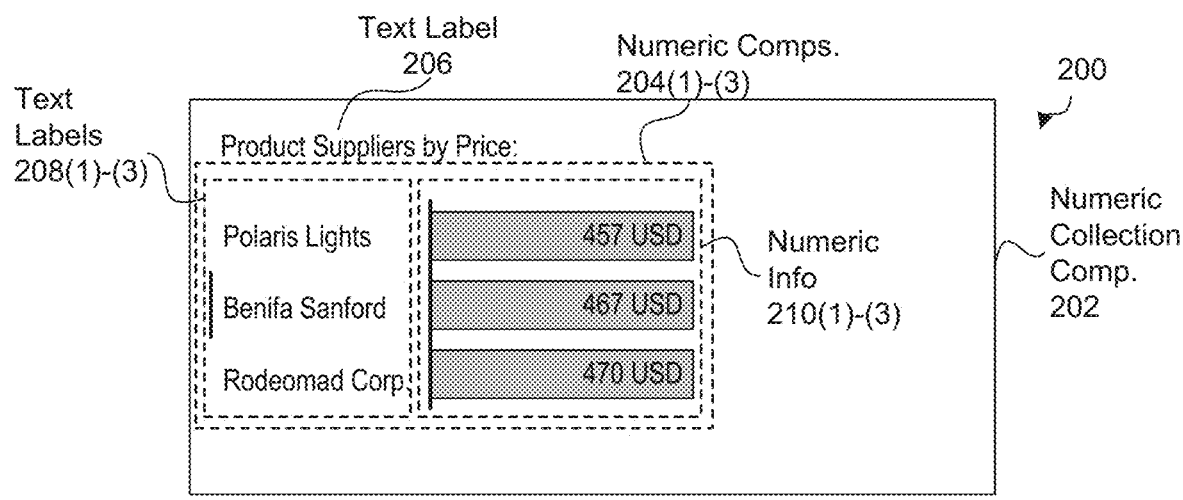
FIGS. 2A-2C depict an example graphical user interface for dynamic switching between display contexts of a facet collection component, according to some embodiments.

FIG. 2A illustrates a GUI 200 presenting a graphical representation of an original numeric collection component 202 comprising a plurality of numeric components 204(1)-(3). As illustrated in FIG. 2A, the original numeric collection component 202 displays the numeric components 204(1)-(3) according to a bar chart context within the GUI 200. As described in detail herein, the original numeric collection component 202 is a visual control may be added to the source code of an application to present aggregated data to a user. In some embodiments, the original numeric collection component 202 may be added during development by a developer or front-end designer. In some other embodiments, the original numeric collection component 202 may be added or configured by an administrator of the application post-development. Further, the original numeric collection component 202 may dynamically implement a plurality of visual forms without manual implementation on part of the developer, front-end designer, and/or administrator. In other words, a developer, front-end designer, and/or administrator would not have to program the numeric component 202 to implement each of the plurality of visual forms within the GUI 200.

In some embodiments, the visual forms may include a line chart context, a donut bar chart context, a comparison chart context, or a bar chart context. The original numeric collection component 202 may be presented in another visual form based upon a selection of a user, configuration by an administrator, one or more attributes of the data presented by the original numeric collection component 202, usage history of the original numeric collection component 202, usage history of the numeric component 204(1)-(3), one or more attributes of the user of GUI 200. Further, the numeric collection component may be configured to dynamically modify the plurality of numeric components 204(1)-(3) included in the numeric collection facet.

As illustrated in FIG. 2A, the original numeric collection component 202 presents a text label 206 indicating that the original numeric collection component 202 provides product supplier price information, and the numeric components 204(1)-(3). Referring to FIG. 2A, the original numeric collection component 202 displays the numeric components 204(1)-(3) according to a first visual context. In particular, the numeric components 204(1)-(3) are presented according to a bar chart context, wherein the text labels 208(1)-(3) of the numeric components 204(1)-(3) are displayed adjacent to bar graph representations of the numeric information 210(1)-(3) of the numeric components 204(1)-(3). However, in some embodiments, the user may endeavor to view the numeric components 204(1)-(3) of the original numeric collection component 202 according to a second visual context.

FIG. 213 illustrates the GUI 200 including the graphical representation of the original numeric collection component 202 and a context menu 212. In some embodiments, a user may employ the context menu 212 to select a second visual context for viewing the numeric information 210(1)-(3). For example, the user may prefer to view the numeric components 204(1)-(3) of the original numeric collection component 202 in a donut bar context instead of the bar chart context. As such, the user may trigger presentation of the context menu 212 which presents a plurality of visual contexts 214(1)-(4) supported by the original numeric collection component 202. In some embodiments, the visual contexts 214 displayed within the context menu 212 may be determined based upon one or more attributes of the numeric components 204(1)-(3) and/or one or more attributes of the original numeric collection component 202. For instance, the context menu 212 may include one or more visual contexts 214 most appropriate for comparing a plurality of data points based on the original numeric collection component 202 including more than numeric component (i.e., the numeric components 204(1)-(3)).

Additionally, the user may employ an input device to select a new visual context from the plurality of visual contexts presented in the context menu 212. Although FIG. 213 illustrates that the context menu 212 may include a drop down menu comprising the plurality of visual contexts 214(1)-(4), the context menu 212 may also include input fields, radio buttons, checkboxes, scrolling panels, or any other methods of user selection within a graphical user interface of a computing device. Additionally, or alternatively, the user may use a keyboard shortcut or any other digital input means to select a new visual context. Additionally, or alternatively, the user may use a keyboard shortcut or any other input means to select a new visual context.

Figure 2B:
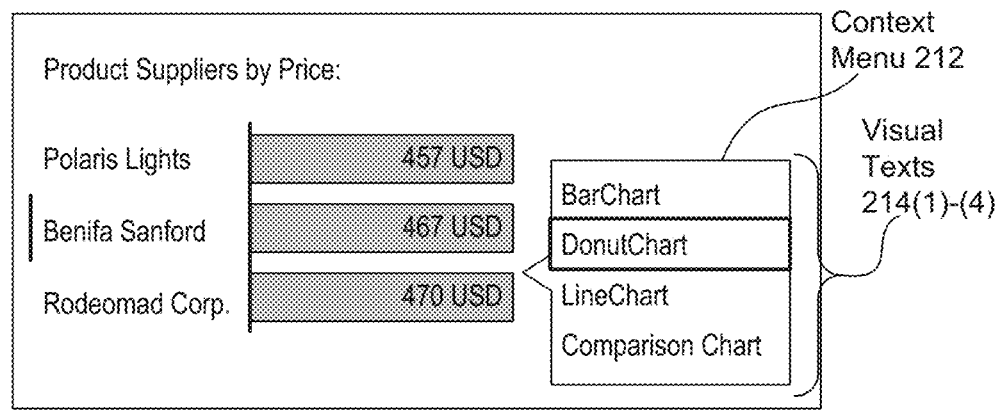
Figure 2C:
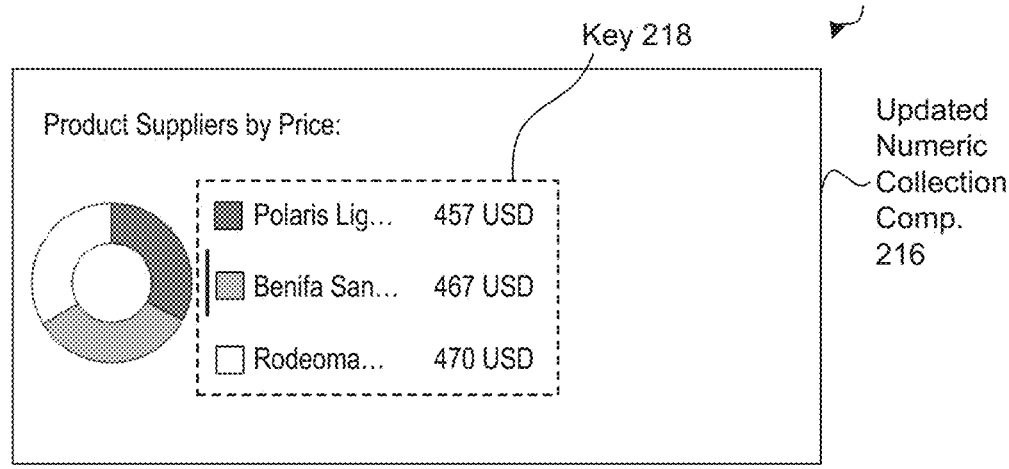

FIG. 2C illustrates the GUI 200 including a graphical representation of an updated numeric collection component 216. As illustrated in FIG. 2C, the selection of the new visual context causes the original numeric collection component 202 that displayed the numeric components 204(1)-(3) according to the bar chart context to be replaced with the updated numeric collection component 216 that displays the numeric components 204(1)-(3) according to the donut bar context. In the donut bar context, the updated numeric collection component 216 illustrates the aggregated product supplier price information in a donut bar chart based on the numeric components 204(1)-(3). Additionally, the updated Further, the updated numeric collection component 216 includes a key 218 identifying the colors representing each product supplier in the donut bar chart and a text representation of the numeric information 210(1)-(3).

FIG. 3A illustrates a GUI 300 including a graphical representation of a numeric collection component 302 that displays comparison data for a plurality of numeric components 304(1)-(4), and a table including a plurality of numeric components 306(1)-(7). As illustrated in FIG. 3A, the graphical representation of the original numeric collection component 302 includes a text label 308 that indicates that the original numeric collection component 302 presents information comparing the delivery times of the product suppliers associated with the numeric components 304(1)-(4). Further, FIG. 3A illustrates the numeric components 304(1)-(4) according to the bar chart context. In some embodiments, a user of the GUI may employ the graphical representation of the original numeric collection component 302 to determine which of the product suppliers associated with the numeric components 304(1)-(4) should be used to order a product.

Further, the user may endeavor to include another product supplier in the comparison illustrated by the original numeric collection component 302. For example, the user may want to also include the delivery time of the Rodeomad Corp in comparative illustration. As such, the user may add a numeric component 306(7) corresponding to the Rodeomad Corp. to the original numeric collection component 302. FIG. 3B illustrates user selection of the a graphical representation of the numeric component 306(7) representing the delivery time of the Rodeomad Corp., and FIG. 3C illustrates the user dragging the numeric component 306(7) to the numeric collection component 302.

FIG. 3D illustrates the GUI 300 including a graphical representation of an updated numeric collection component 310. As illustrated in FIG. 3D, dragging the numeric component 306(7) to the original numeric collection component 302 causes the original numeric collection component 302 that displayed the numeric components 304(1)-(4) according to the bar chart context to be replaced with the updated numeric collection component 310 that displays the numeric components 304(1)-(4) and a copy of the numeric component 306(7) according to the bar chart context. As a result, the user may compare the delivery times of the product suppliers corresponding to the numeric components 304(1)-(4) and the product supplier corresponding to the numeric component 306(7).

In some embodiments, the original numeric collection component 302 may validate the numeric component 306(7) before adding the numeric component 306(7) to the plurality of numeric components contained within the original numeric collection component 302. For example, the original numeric collection component 302 may verify that the numeric component 306(7) includes the information needed for presentation in the display context of the original numeric collection component 302. In some other examples, the original numeric collection component 302 may verify that the unit type of a numeric value of the numeric component 306(7) matches the numeric values of the numeric components 304(1)-(4). For instance, the original numeric collection component 302 may add the numeric component 306(7) because the numeric values of the numeric components 304(1)-(4) and the numeric component 306(7) are both measurements in a unit of time (i.e., days). However, if the unit type of the numeric component 306(7) pertained to temperature, the original numeric collection component 302 may determine that the numeric component 306(7) cannot be added to the original numeric collection component 302 to create the updated numeric collection component 310.

Further, in some embodiments, the original numeric collection component 302 may verify that the numeric component 306(7) can be displayed in the same display context as the numeric components 304(1)-(4) within the graphical representation of the original numeric collection component 302. For example, if the numeric components 304(1)-(4) are displayed in a progress bar context within the graphical representation of the original numeric collection component 302, the original numeric collection component 302 may determine whether the numeric component 306(7) can be displayed in the progress bar context based on the supported display contexts of the numeric component 306(7). If the numeric component 306(7) does not support the progress bar context, the original numeric collection component 302 may determine that the numeric component 306(7) cannot be added to the original numeric collection component 302 to create the updated numeric collection component 310.

Additionally, or alternatively, the user may also select one of the numeric components 304(1)-(4) or the copy of numeric component 306(7) from within the updated numeric collection component 310, and drag the selected numeric component out of the updated numeric collection component 310 to create a modified numeric collection component without the selected component. In some embodiments described herein, a numeric collection component may be configured to dynamically add and remove numeric components without manual implementation on part of the developer, front-end designer, and/or administrator. In other words, a developer, front-end designer, and/or administrator would not have to program the original numeric collection component 302 to implement a numeric collection component that may dynamically add or remove any numeric component within the GUI 300.

Figure 4:
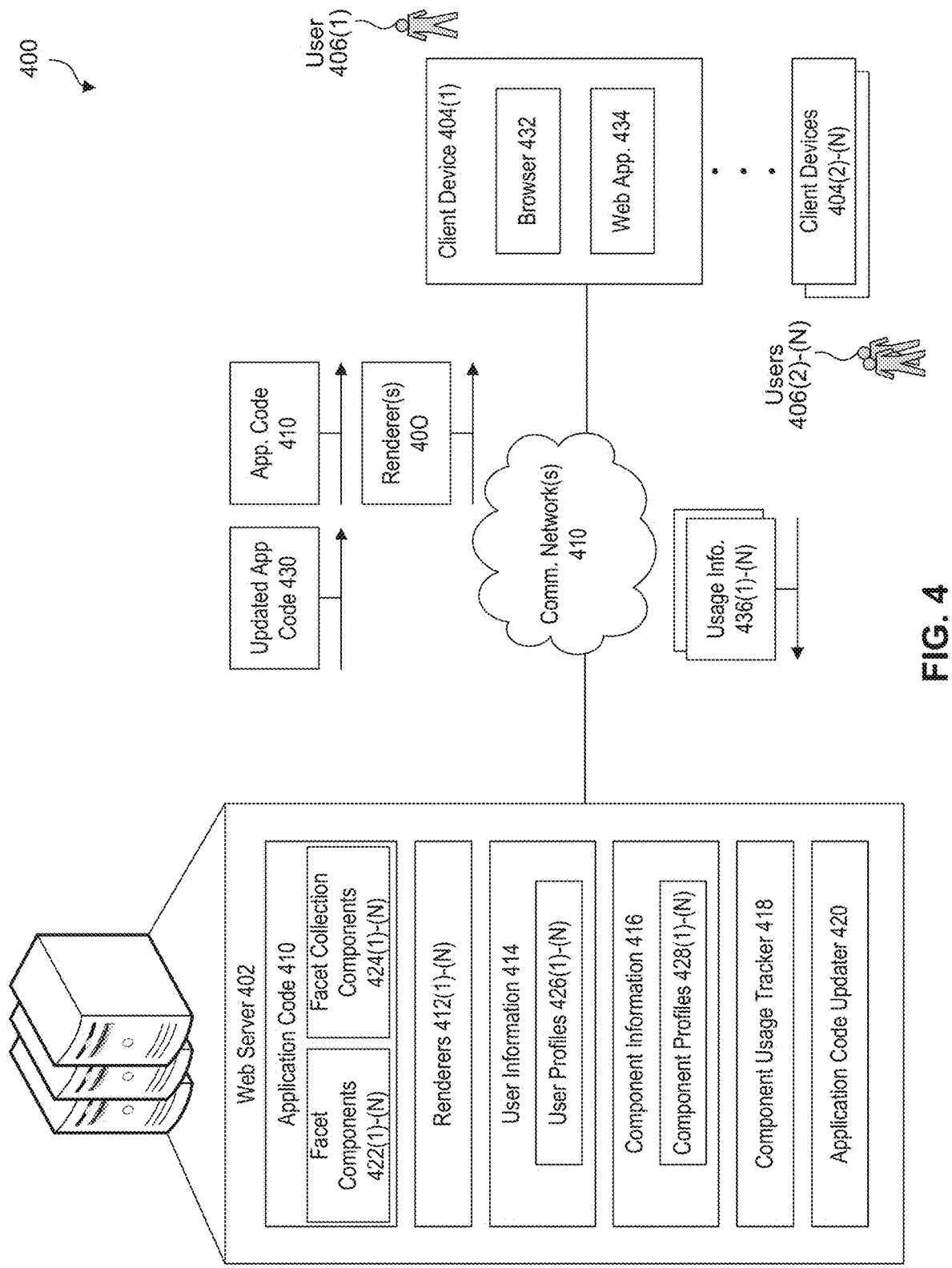
FIG. 4 is a block diagram illustrating a client/server system for implementing facet components and facet collection components in application code, according to some embodiments.

FIG. 4 is a block diagram illustrating a client/server system for implementing facet components and facet collection components in application code, according to some embodiments. As illustrated in FIG. 4, the client/server system 400 includes a web server 402 and a plurality of client devices 404(1)-(N). Further, the first client device 404(1) is associated with a first user 406, and the second client device 404(2) is associated with a second user 406(2), an Nth client device 404(N) is associated with an Nth user 406(N), and so forth.

Additionally, the web server 402 and the plurality of client devices 404(1)-(N) may communicate via a communication network(s) 408. The communication network(s) 408 may include any or all of a private network, personal area network (PAN), Local-Area Network (LAN), Wide-Area Network (WAN), or the Internet. Further, the connection between the web server 402 or the plurality of client devices 404(1)-(N), and the communication network(s) 408 may be a wireless connection (e.g., Bluetooth, Wi-Fi connection, etc.), or a wired connection (e.g., Ethernet, universal serial bus (USB), etc.), or a combination thereof.

As illustrated in FIG. 4, the web server 402 includes application code 410, renderers 412, user information 414, component information 416, a component usage tracker 418, and an application code updater 420. In some embodiments, the web server 402 is configured receive requests from the plurality of client devices 404(1)-(N) for the application code 410, and send the application code 410 to the client devices 404(1)-(N). In some embodiments, the application code may be written in one or more programming languages. Some examples of programming languages include JavaScript, Hyper Text Markup Language (HTML), HTML5, CSS, BASIC, C, Lisp, Lua, Python, Ruby, Java, Groovy, C, C++, C#, Visual Basic, Objective-C, Rust, and Scala.

Further, the application code 410 may include a plurality of facet components 422(1)-(N) (e.g., numeric component 102) and a plurality of facet collection components 424(1)-(N) (e.g., numeric components 202 and 302). In some embodiments, the plurality of facet components 422(1)-(N) and the plurality of facet collection components 424(1)-(N) may be added to the application code 410 by a developer during the development process. For example, the developer may use a source editor or integrated development environment to incorporate the facet components 422(1)-(N) and the facet collection components 424(1)-(N) into the application code 410. In some other embodiments, the facet components 422(1)-(N) and the facet collection components 424(1)-(N) may be added to the application code 410 by a front-end designer during the development process. For example, the front-end designer may use a WYSIWYG editor to incorporate the facet components 422(1)-(N) and the facet collection components 424(1)-(N) into the application code 410. In yet still another example, an administrator of an application associated with the application code 410 may configure the facet components 422(1)-(N) and the facet collection components 424(1)-(N) of the application code 410. For example, the administrator may use a runtime authoring tool to select the display contexts supported by the facet component 422(1).

As described in detail herein, a facet component 422 may be a control component of a user interface library. In some embodiments, the facet component 422 may be used to represent data instead of traditional programming language base types (e.g., mimetic types, boolean types, character types, and date types). Further, the facet component 422 may provide functionality for dynamically switching between different visual contexts for displaying information associated with the facet component 422 within a GUI.

In some examples, the facet component 422 is configured to include an event handler capable of processing input actions (e.g., mouse clicks, mouse drag, keyboard events, scroll actions, etc.) to any of the supported display contexts (e.g., a pill display context, a rating indicator context, a progress bar context, a microchart context) of the facet component 422. As such, the facet component 422 may implement an interface configured to process input to any of the supported display contexts of the facet component 422. Further, the facet component 422 is configured to load rendering components (e.g., the renderers 412(1)-(N)) for the supported display contexts of the facet component 422. Once a facet component loads a rendering component, the facet component 422 may call a render function of the rendering component that switches the graphical representation of the facet component 422 from a current display context to the display context associated with the rendering component. In some embodiments, the rendering component may generate application code for displaying the graphical representation. For example, in a Model-View-Controller web application, the rendering component may generate and format the view logic corresponding to the graphical representation.

In some other examples, the facet component 422 does not include the logic for processing events. As a result, the facet component 422 may be configured to detect an event, convert the event to an event type associated with the current display context, and pass the converted event to another component configured to process the event.

Each facet component 422 may include at least one or more component attributes. The component attributes may include a list of display contexts supported by the facet component 422, a text label, an attribute indicating whether the text label is viewable, a numeric value, a maximum value of the numeric value, a unit type of the numeric value, an attribute indicating whether the numeric value is a percentage, a type of the current display context, a state of the facet component 422, an attribute indicating whether a graphical representation of the facet component 422 is draggable within a GUI, an attribute indicating whether the facet component 422 may be used to show a context menu for switching between display contexts, and an attribute indicating whether the face component 422 should be automatically formatted. The numeric value and the maximum numeric value may be used to determine a percentage or progress value associated with the facet component 422 (e.g., numeric value/maximum value). Some examples of the current state of the face component 522 may include none, info, success, warning, or error. Further, the facet component may update its state based on event handling actions.

As described herein, the component attributes of a facet component 422 may be used to determine whether a facet component 422 may be added to a facet collection component 424. For example, a validation function of a facet collection component 424 may determine whether the component attributes of the facet component 422 match a required criteria for inclusion into the facet collection component 424.

As described in detail herein, a facet collection component 424 may be a control component of a user interface library. The facet collection component 424 may be used to represent a collection of facet components 422. Further, the facet collection component 424 may provide functionality for dynamically switching between different visual contexts for displaying the facet components 422 of the facet collection component 424 within a GUI. In some embodiments, a facet collection component 424 may be used to provide a visual comparison of data associated with a plurality of facet components 422.

In some examples, the facet collection component 424 is configured to include an event handler capable of processing input actions (e.g., mouse clicks, mouse drag, keyboard events, scroll actions, etc.) to any of the supported display contexts (e.g., a line chart context, a donut bar chart context, a comparison chart context, or a bar chart context, table chart context) of the facet collection component 424. As such, the facet collection component 424 may implement an interface configured to process input to any of the supported display contexts of the facet collection component 424. Further, the facet collection component 424 is configured to load rendering components (e.g., the renderers 412(1)-(N)) for the supported display contexts of the facet collection component 424 and the supported display contexts of the facet components 422 of the facet collection component 424. Once a facet collection component 424 loads a rendering component, the facet collection component 424 may call a render function of the rendering component that may switch the graphical representation of the facet collection component 424 from a current display context to the display context associated with the rendering component. In some other examples, the facet collection component 424 does not include the logic for processing events. As a result, the facet collection component 424 may be configured to detect an event, convert the event to an event type associated with the current display context, and pass the converted event to another component configured to process the event.

Each facet collection component 424 may include at least one or more component attributes. In some embodiments, the component attributes may include a list of display contexts supported by the facet collection component 424, a text label, an attribute indicating whether the text label is viewable, a maximum amount of facet components 422 that may be included into the facet collection component 424, a type of the current display context, or a state of the facet collection component 424.

The user information 414 includes information about the users 406(1)-(N) and client devices 404(1)-(N) in the client/server system 400. As illustrated in FIG. 4, the user information 414 includes user profiles 426 corresponding to the users 406(1)-(N) using the client devices 404(1)-(N). For example, the first user profile 426(1) is associated with the first user 406(1), the nth user profile 426(N) is associated with the nth user 406(N), and so forth. In certain embodiments, the user profiles 426 include user activity, user roles, user workflows, user settings, authentication information, encryption information, authorization information, biographical information, demographic information, special needs and disabilities, executed service agreements, contact information, and user reviews/ratings.

The component information 416 includes information about the facet components 422(1)-(N) and the facet collection components 424(1)-(N) of the application code 410. As illustrated in FIG. 4, the component information 416 includes component profiles 428 corresponding to the facet components 422(1)-(N) and the facet collection components 424(1)-(N). For example, the first component profile 428(1) is associated with the first facet component 422 (1) and the 2nd component profile 428(2) is associated with the first facet collection component 424(2). In some embodiments, the components profiles 428 include user activity with respect to the facet components 422(1)-(N) and the facet collection components 424(1)-(N), and user reviews of the facet components 422(1)-(N) and the facet collection components 424(1)-(N).

The component usage tracker 418 may monitor and analyze the component information 416 and user information 414 to determine usage patterns pertaining to the facet components 422(1)-(N) and the facet collection components 424(1)-(N) of the application code 410. For instance, the component usage tracker 418 may determine user preferences with respect to specific types of data displayed using the facet components 422(1)-(N) and the facet collection components 424(1)-(N) of the application code 410. As an example, the component usage tracker 418 may determine that the users 406 prefer to view comparative data with a temporal component in a line chart context. In some other instances, the component usage tracker 418 may determine user preferences with respect to specific facet components 422(1)-(N) and/or the facet collection components 424(1)-(N) of the application code 410. As an example, the component usage tracker 418 may determine that the users 406 prefer to view the numeric component 102 in a KPI context based on ratings provided by the users 406. In yet still some other instances, the component usage tracker 418 may determine user preferences particular to individual users or specific type of users. As an example, the component usage tracker 418 may determine that the users 406 with auditing workflows prefer to view the numeric component 102 in a KPI context identifying that the users 406 with auditing workflows frequently selected the KPI context for the numeric component 102.

In some embodiments, the component usage tracker 418 may employ machine learning techniques and/or pattern recognition techniques to identify usage patterns based on the component information 416 and/or the user information 414. Further, component usage tracker 418 may include hidden markov models, decision trees, regression models, support vector machines, or artificial neural networks for identifying usage patterns corresponding to the users, the facet components 422(1)-(N), and the facet collection components 424(1)-(N).

The application code updater 420 may update the application code 430 to generate updated application code 430 based on activity patterns identified by the component usage tracker 418. For instance, the application code updater 420 may update a default display context of a facet component based on a preference identified by the component usage tracker 418. As an example, the component usage tracker 418 may identify that a statistically significant amount of the users 406 switch to the numeric facet component 112 in the progress bar context from the numeric facet component 102 in the KPI context when completing an accounting workflow. As a result, the application code updater 420 may generate updated application code 430 that presents the numeric facet component 112 instead of the numeric facet component 102 to the users 406 performing the accounting workflow. As another example, the component usage tracker 418 may identify that a particular user 406 prefers the bar chart context to the donut bar context when viewing numeric collections components 424. As such, the application code updater 420 may generate updated application code 430 with the bar chart context as the default display context for numeric collection components 424.

In some other instances, the application code updater 420 may generate updated application code 430 so that the users 406 are presented recommendations based on activity patterns identified by the component usage trackers 418. For example, the component usage tracker 418 may identify that a statistically significant amount of the users 406 select the progress bar context for viewing the numeric facet component 112. As a result, the application code updater 420 may generate updated application code 430 that asks the users 406 if they would like to view to the numeric facet component 112 in the progress bar context.

As illustrated in FIG. 4, the client device 404(1) includes a browser 432 and a web application 434. In some embodiments, the browser 432 may request the application code 410 and/or the updated application code 430 from the web server 402. Further, the browser 432 may interpret and execute the application code 410 and/or the updated application code 430 to generate the web application 434 including graphical representations of the facet components 422(1)-(N) and the facet collection components 424(1)-(N). Additionally, the browser 432 may send the web server 402 usage information 436(1) describing use of the web application 434 by the user 406(1). As described in detail herein, the usage information 436 may be stored as user information 414 and component information 416, and used by the component usage tracker 418 to identify patterns of use corresponding to the facet components 40C(1)-(N) and the facet collection components 424(1)-(N).

Figure 5:
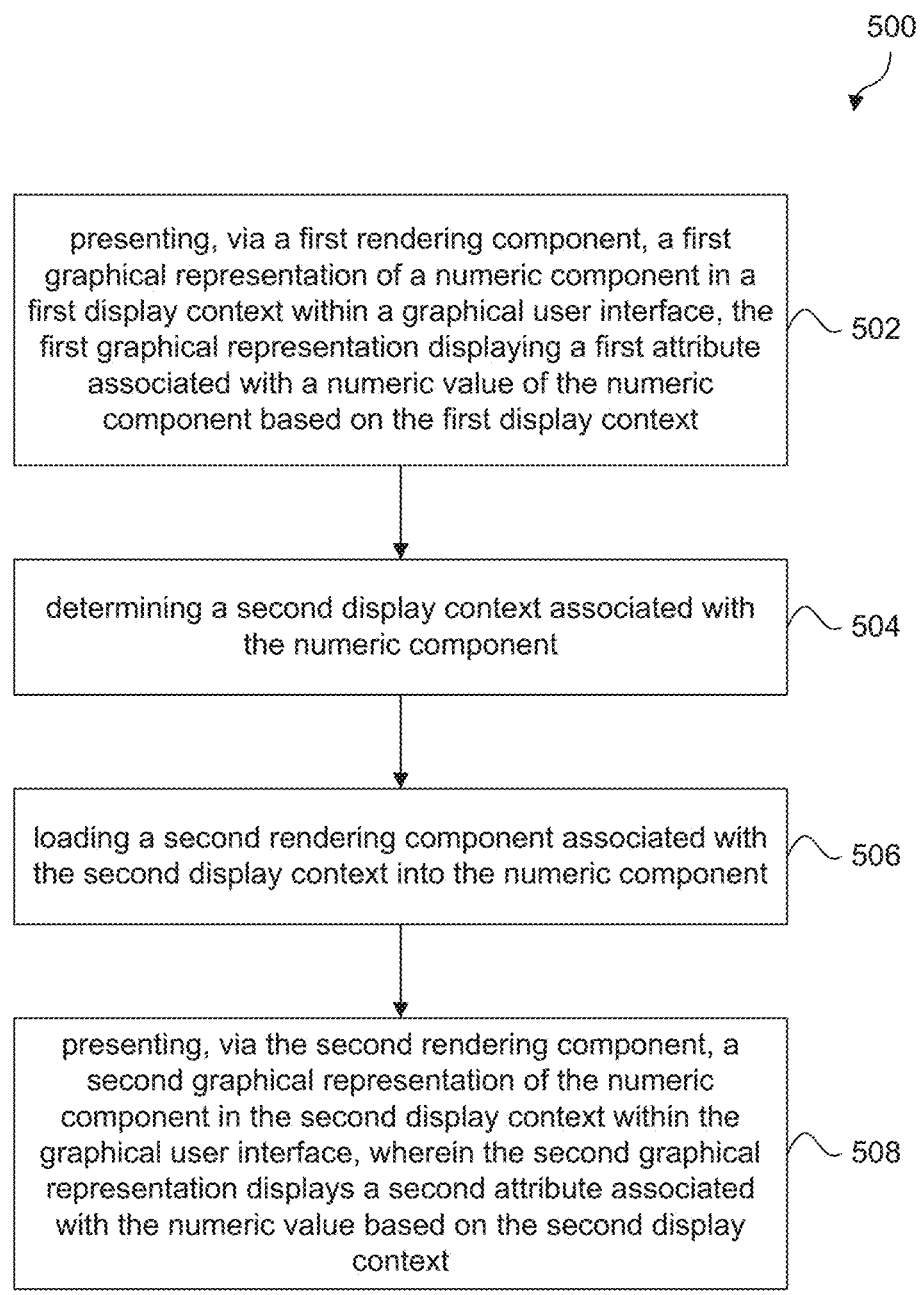
FIG. 5 is a flowchart illustrating a process for dynamic switching between display contexts of a facet component, according to some embodiments.

FIG. 5 is a flowchart illustrating for a process for dynamic switching between display contexts of a facet component, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1 and 4. However, method 500 is not limited to those example embodiments.

At 502, a device presents, via a first rendering component, a first graphical representation of a numeric component in a first display context within a graphical user interface, the first graphical representation displaying a first attribute associated with a numeric value of the numeric component based on the first display context.

For example, the client device 404(1) may receive application code 410 including a numeric component 422(1), and a renderer 412(1) corresponding to a first display context of the numeric component 422. Further, the device may interpret and execute the application code 410 to determine a web application 434. In some embodiments, the renderer 4012(1) may be employed by the web application 434 to display the graphical representation of the facet component 422 in the first display context within a GUI of the web application 434. As illustrated in FIG. 1A, the first display context may include a KPI context. In some other embodiments, the first display context may include a pill display context, a rating indicator context, a progress bar context, a microchart context, or any other graphical context that may be used to display information within a GUI.

At 504, a device determines a second display context associated with the numeric component. For example, a user of the device may request a change from the first display context to a second display context via the context menu 108. In some other embodiments, the web application 434 may recommend that the user change from the first display context to a second display context. In yet still some other embodiments, the web application 434 may automatically change from the first display context to a second display context.

At 506, a device loads a second rendering component associated with the second display context into the numeric component. For example, the web application 434 may identify a renderer 412(2) associated with the second display context, and load the identified renderer 412(2) into the facet component 422(1). In some embodiments, the web application 434 may employ dependency injection to load the renderer 412(2) into the numeric component 422(1). Additionally, the web application 434 may perform preloading or lazy loading of the renderer 412(2).

At 508, a device presents, via the second rendering component, a second graphical representation of the numeric component in the second display context within the GUI, wherein the second graphical representation displays a second attribute associated with the numeric value based on the second display context.

For example, the renderer 412(2) may be employed by the web application 434 to display a graphical representation of the facet component 422(1) in the second display context within a GUI of the web application 434. As illustrated in FIG. IC, the second display context may include a progress bar context. In some other embodiments, the second display context may include a pill display context, a rating indicator context, a microchart context, or any other graphical context that may be used to display information within a GUI.

The numeric component 422(1) may identify, in a document object model (DOM) corresponding to the GUI, a first node associated with the graphical representation of the numeric component 422(1) in the first display context. Further, the facet component 422(1) may remove, from the DOM, the first node associated with the graphical representation. Additionally, the facet component 422(1) may employ the renderer 412(2) to insert, into the DOM, a second node associated with a new graphical representation of the facet collection component 422(1) in the second display context.

Figure 6:
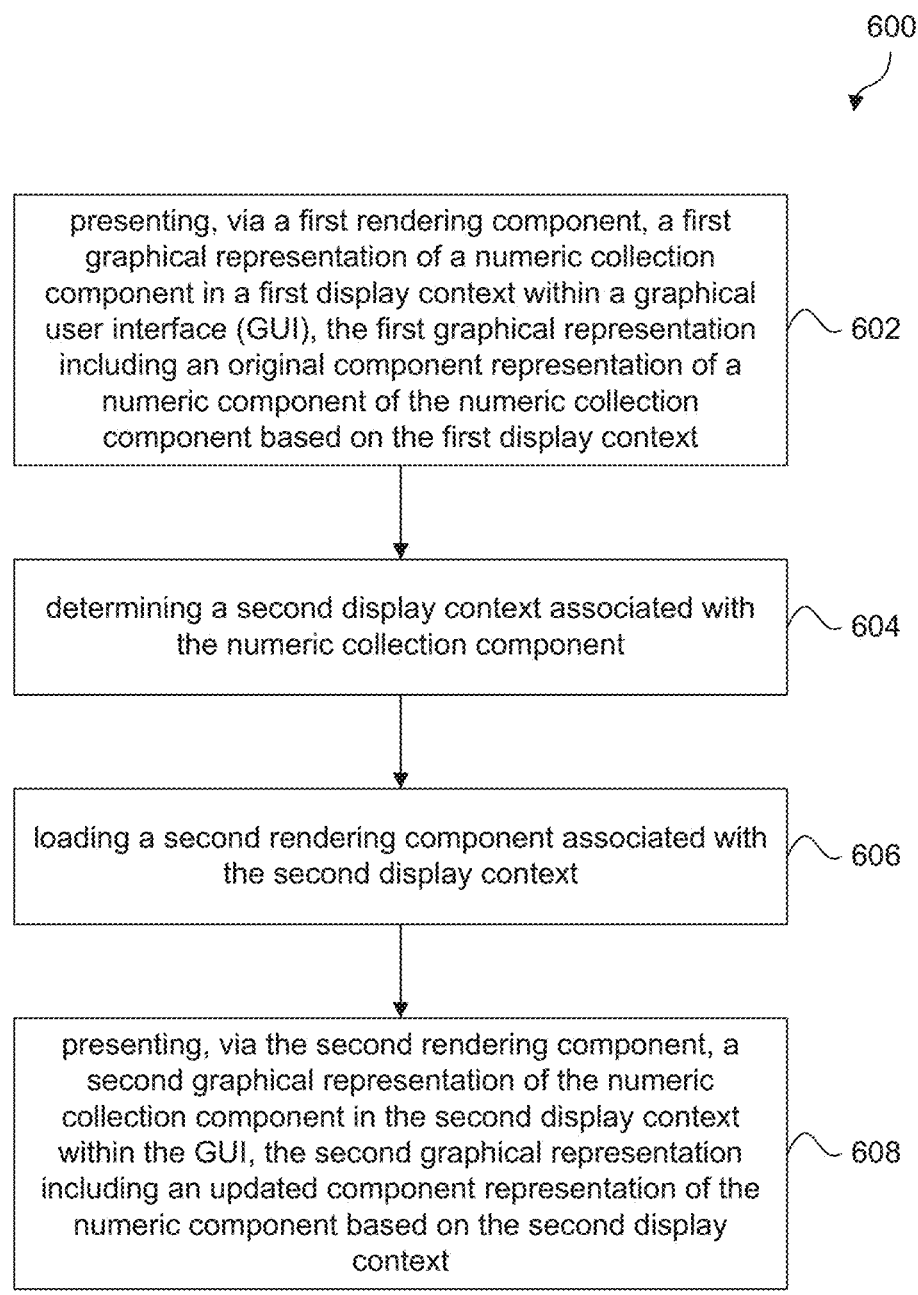
FIG. 6 is a flowchart illustrating a process for dynamic switching between display contexts of a facet collection component, according to some embodiments.

FIG. 6 is a flowchart illustrating a process for dynamic switching between display contexts of a facet collection component, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIGS. 2 and 4. However, method 600 is not limited to those example embodiments.

At 602, a device presents, via a first rendering component, a first graphical representation of a numeric collection component in a first display context within a graphical user interface (GUI), the first graphical representation including an original component representation of a numeric component of the numeric collection component based on the first display context.

For example, the client device 404(1) may receive application code 410 including a numeric collection component 424(1), and a renderer 412(3) corresponding to a first display context of the numeric collection component 424(1). Further, the device may interpret and execute the application 410 code to determine a web application 434. In some embodiments, the renderer 412(3) may be employed by the web application 434 to display the graphical representation of the numeric collection component 424(1) in the first display context within a GUI of the web application 434. As illustrated in FIG. 2A, the first display context may include a bar chart context. In some other embodiments, the first display context may include a line chart context, a donut bar chart context, a comparison chart context, or a bar chart context, table chart context, or any other graphical context that may be used to display aggregated information within a GUI.

At 604, a device determines a second display context associated with the numeric collection component. For example, a user 406(1) of the client device 404(1) may request a change from the first display context to a second display context via the context menu 212. In some other embodiments, the web application 434 may recommend that the user 406(1) change from the first display context to a second display context. In yet still some other embodiments, the web application 434 may automatically change from the first display context to a second display context based on the user information 414 or the component information 416.

At 606, a device loads a second rendering component associated with the second display context. For example, the web application 434 may identify a renderer 412(4) associated with the second display context, and load the identified renderer 412(4) into the numeric collection component 424(1). In some embodiments, the web application 434 may employ dependency injection to load the renderer 412(4) into the numeric collection component 424(1). Additionally, the web application 434 may perform preloading or lazy loading of the renderer 412(4).

At 608, a device presents, via the second rendering component, a second graphical representation of the numeric collection component in the second display context, the second graphical representation including an updated component representation of the numeric component based on the second display context.

For example, the renderer 412(4) may be employed by the web application 434 to display the graphical representation of the numeric collection component 424(1) in the second display context within a GUI of the web application 434. As illustrated in FIG. 2C, the second display context may include a donut bar context. In some other embodiments, the second display context may include a line chart context, a comparison chart context, a table chart context, or any other graphical context that may be used to display aggregated information within a GUI.

In some embodiments, the numeric collection component 424(1) may identify, in a DOM corresponding to the GUI, a first node associated with the graphical representation of the numeric collection component 424(1) in the first display context. Further, the numeric collection component 424(1) may remove, from the DOM, the first node associated with the first graphical representation. Additionally, the numeric component 424(1) may employ the renderer 412(4) to insert, into the DOM, a second node associated with the second graphical representation of the numeric collection component 424(1) in the second display context.

Figure 7:
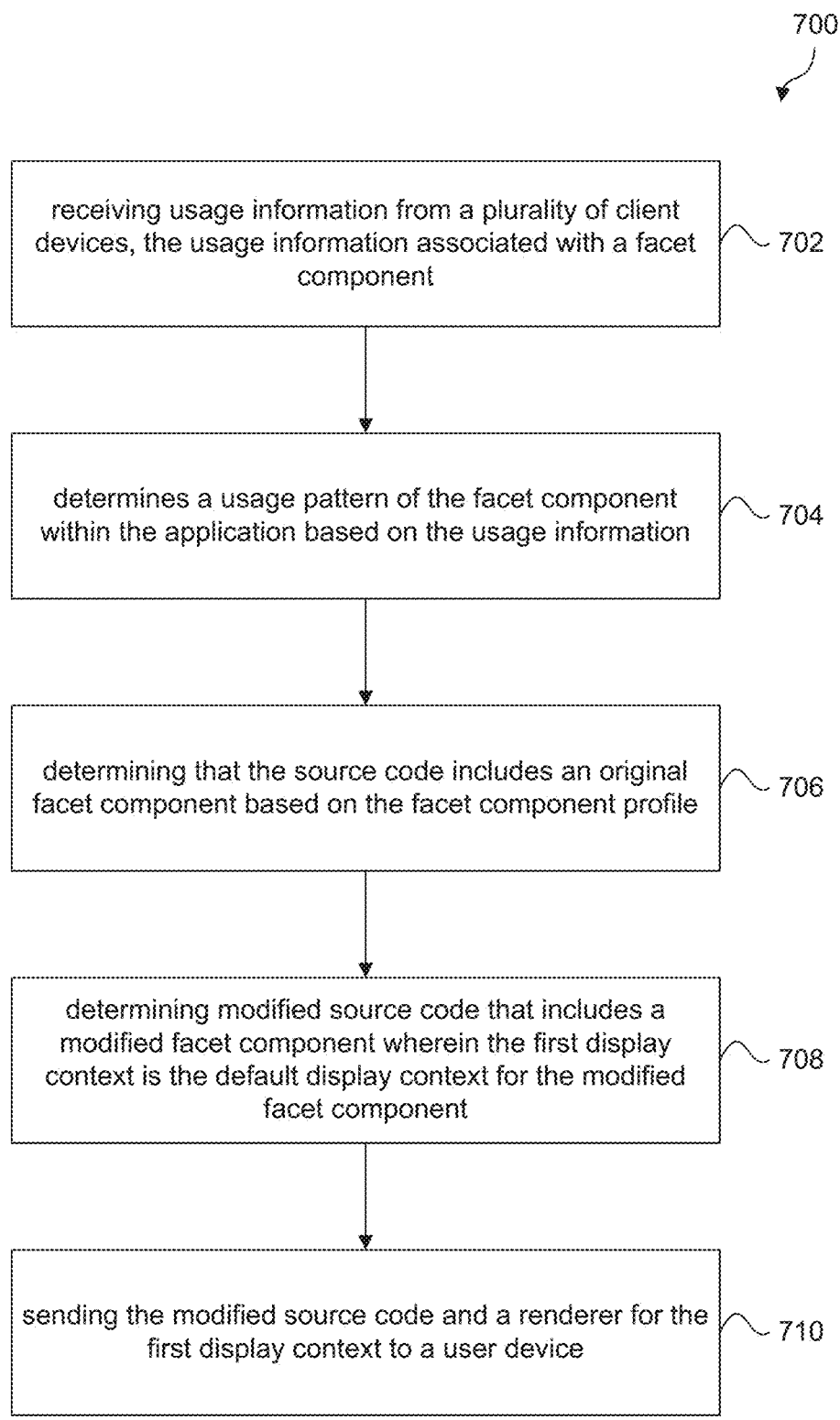
FIG. 7 is a flowchart illustrating a process for dynamical personalization of a facet component, according to some embodiments.

FIG. 7 is a flowchart illustrating a process for a process for dynamical personalization of a facet component, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 4. However, method 700 is not limited to those example embodiments. Further, although the method 700 is applied to a facet component, the method 700 may be also applied to a facet collection component.

At 702, a device receives usage information from a plurality of client devices, the usage information associated with a facet component. For example, the web server 402 receives the usage information 436(1)-(N) from the plurality of client devices 404(1)-(N). Further, the usage information 436(1)-(N) may include facet component identifiers identifying the facet components 422(1)-(N) associated with the usage information 436(1)-(N). Upon receipt of the usage information 436(1)-(N), the web server 402 may store the usage information 436(1)-(N) as component information 416 and/or user information 414.

At 704, the device determines a usage pattern of the facet component within the application based on the usage information. For example, the component usage tracker 418 may monitor and analyze the component information 416, user information 414, and/or usage information 436 to determine a usage pattern pertaining to the facet component 422(1). In some embodiments, the component usage tracker 418 may determine a preferred display context of a facet component 422 or an infrequently used display context of a facet component 422. Further, the component usage tracker 418 may determine preferred display contexts for different users or different types of users, or infrequently used display contexts for different users or different types of users.

At 706, the device determines that the source code includes an original facet component based on the facet component profile. For example, the component profile 426(1) may indicate that the facet component 422(1) is included in the application code 410.

At 708, the device determines modified source code that includes a modified facet component wherein the first display context is the default display context for the modified facet component. For example, the application code updater 420 may update the application code 410 to reflect that the first display context should be the default display context for the facet component 422 within the application corresponding to the application code 410. In some embodiments, the application code updater 420 may set a default display context attribute of the facet component 422 to the first display context.

At 710, the device sends the modified source code and a renderer for the first display context to a user device. For example, the web server 402 may receive a web document request from the client device 406(1), and send the application code 410 to the client device 406(1). Further, when the browser of the client device 406(1) interprets and executes the application code 410 to generate the application 434, the facet component 422 may initially load in the first display state given that the facet component 422 has been updated based on the usage information 436.

Figure 8E:
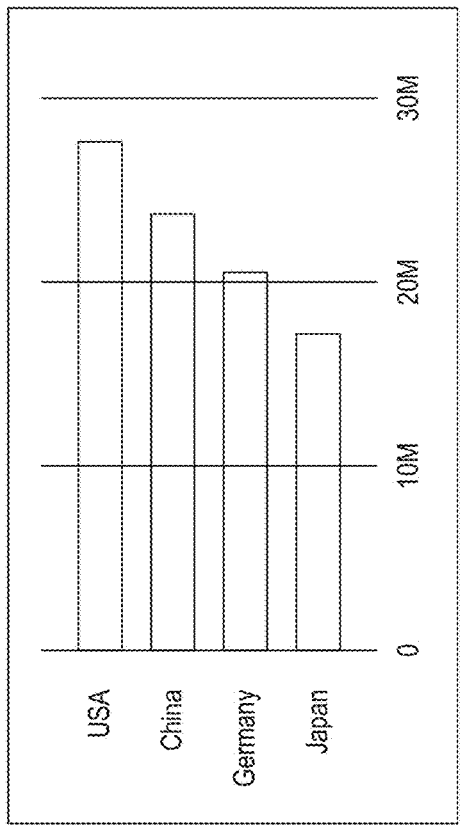
Figure 8G:
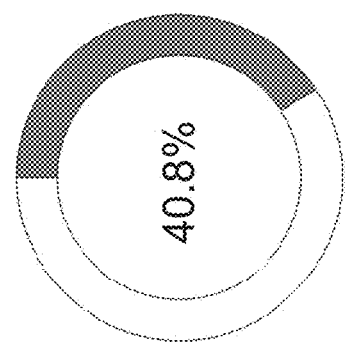
Figure 8D:
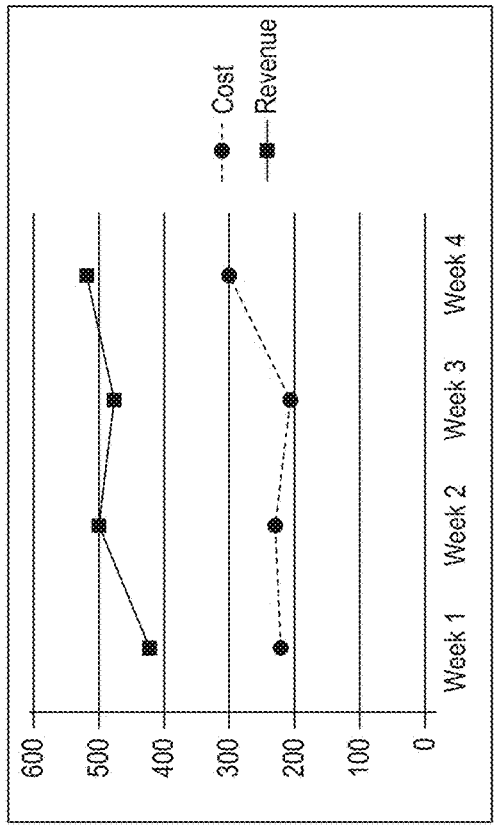
Figure 8F:
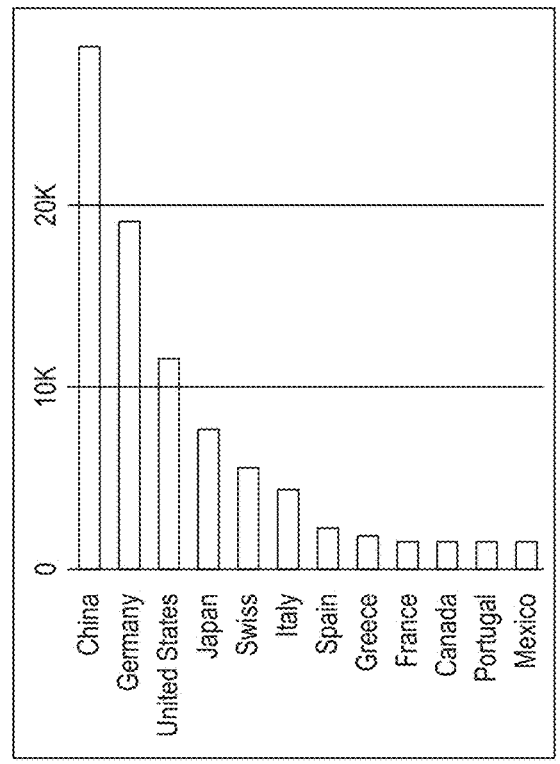

FIGS. 8A-G illustrate display contexts according to embodiments of the present disclosure. FIGS. 8A-8F display graphical representations of facet collection components according to embodiments of the present disclosure. FIG. 8G displays a graphical representation of a facet component according to embodiments of the present disclosure.

Figure 9:
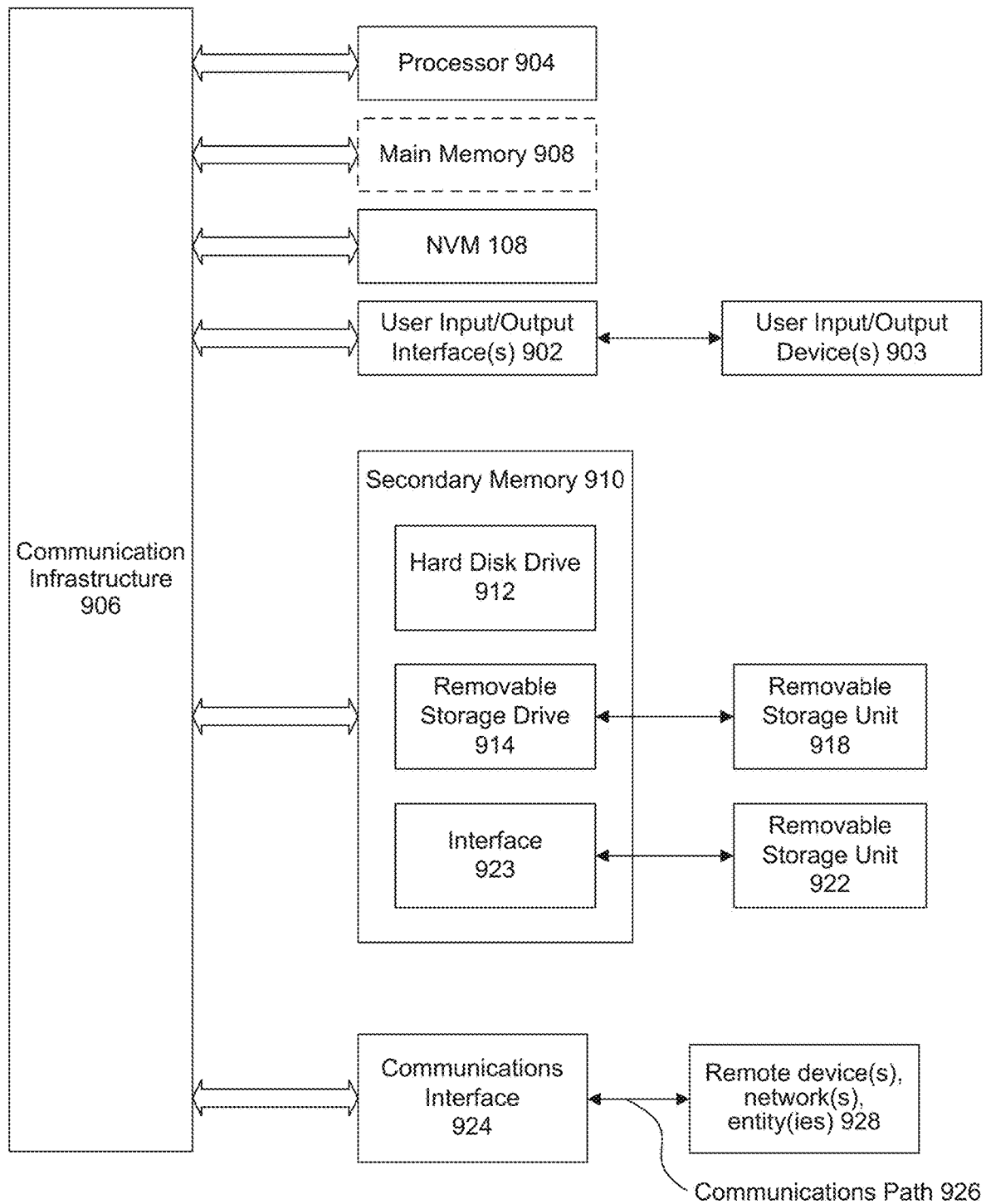
FIG. 9 is an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
presenting, via a first rendering component, a first graphical representation of a numeric component in a first display context within a graphical user interface (GUI), the first graphical representation displaying a first attribute associated with a numeric value of the numeric component based on the first display context, wherein the first rendering component is identified as a default component in application code used to render the GUI;

determining a second display context associated with the numeric component;

receiving a selection of a second rendering component associated with the second display context into the numeric component;

updating tracking information based on the selection, wherein the tracking information indicates usage patterns between the first rendering component and the second rendering component for the numeric component;

modifying, by a processor, the default component of the application code, to identify the second rendering component, based on the tracking information; and presenting, via the second rendering component, a second graphical representation of the numeric component in the second display context within the GUI, wherein the second graphical representation displays a second attribute associated with the numeric value based on the second display context.

2. The method of claim 1, wherein determining the second display context associated with the numeric component comprises:

presenting a plurality of display contexts within the GUI; and receiving a selection of the second display context within the GUI.

3. The method of claim 1, wherein presenting the second graphical representation of the numeric component in the second display context comprises:

identifying, in a document object model (DOM) corresponding to the GUI, a first node associated with the first graphical representation of the numeric component in the first display context, wherein the application code comprises code of the DOM;

removing, from the DOM, the first node associated with the first graphical representation; and inserting, into the DOM, a second node associated with the second graphical representation of the numeric component in the second display context.

4. The method of claim 1, wherein the numeric component further includes at least one of a text label, a maximum value, unit type of the numeric value, or a state of the numeric component.

5. The method of claim 1, wherein at least one of the first display context or second display context includes at least one of a pill display context, a rating indicator context, a progress bar context, a microchart context, or a key performance indicator context.

6. The method of claim 1, further comprising:

determining that the numeric component is draggable within the GUI;

determining that the second graphical representation has been relocated to a position of the GUI associated with a numeric collection component; and presenting a third graphical representation of the numeric component within the numeric collection component based on a third display context of the numeric collection component.

7. The method of claim 6, wherein the third display context includes at least one of a line chart, a donut bar chart, a comparison chart, or a bar chart.

8. The method of claim 1, wherein the receiving comprises:

requesting input, via the GUI, as to whether to display the first rendering component or the second rendering component for the numeric component.

9. A non-transitory computer-readable device having instructions stored thereon that, when executed by at least one computing device, causes the at least one computing device to perform operations comprising:

presenting, via a first rendering component, a first graphical representation of a numeric component in a first display context within a graphical user interface (GUI), the first graphical representation displaying a first attribute associated with a numeric value of the numeric component based on the first display context, wherein the first rendering component is identified as a default component in application code used to render the GUI;

determining a second display context associated with the numeric component;

receiving a selection of a second rendering component associated with the second display context into the numeric component;

updating tracking information based on the selection, wherein the tracking information indicates usage patterns between the first rendering component and the second rendering component for the numeric component;

modifying, by a processor, the default component of the application code, to identify the second rendering component, based on the tracking information; and presenting, via the second rendering component, a second graphical representation of the numeric collection component in the second display context within the GUI, the second graphical representation including an updated component representation of the numeric component based on the second display context.

10. The non-transitory computer-readable device of claim 9, wherein the numeric collection component is an original numeric collection component, and wherein the numeric component is a first numeric component, the operations further comprising:

presenting a second component representation of a second numeric component within the GUI;

determining that the second numeric component is draggable within the GUI;

determining that the second component representation has been relocated to a position of the GUI associated with the original numeric collection component;

determining an updated numeric collection component that includes the first numeric component and the second numeric component; and presenting, via the second rendering component, a third graphical representation of the numeric collection component in the second display context; the third graphical representation including the updated component representation and a copy of the second component representation based on the second display context.

11. The non-transitory computer-readable device of claim 10, the operations further comprising:

validating the second numeric component for inclusion within the updated numeric collection component based on at least one of a numeric value of the second numeric component, a unit type of the second numeric component, a label of the second numeric component, or an amount of numeric components within the original numeric collection component.

12. The non-transitory computer-readable device of claim 9, wherein determining the second display context associated with the numeric component comprises:

presenting a plurality of display contexts within the GUI; and receiving selection of the second display context within the GUI.

13. The non-transitory computer-readable device of claim 9, wherein presenting the second graphical representation comprises:
   identifying, in a document object model (DOM) corresponding to the GUI, a first node associated with the first graphical representation of the numeric collection component in the first display context, wherein the application code comprises code of the DOM;
   removing, from the DOM, the first node associated with the first graphical representation; and
   inserting, into the DOM, a second node associated with the second graphical representation of the numeric collection component in the second display context.

14. The non-transitory computer-readable device of claim 9, wherein the numeric component is a first numeric component, and wherein the numeric collection component is an original numeric collection component, the operations further comprising:
   receiving a selection of a second component representation of a second numeric component of the original numeric collection component;
   determining that the second numeric component is draggable within the GUI;
   determining that the second component representation has been relocated to a position of the GUI that is not associated with the original numeric collection component;
   determining an updated numeric collection component that includes the first numeric component and not the second numeric component; and
   presenting, via the second rendering component, a third graphical representation of the updated numeric collection component including the updated component representation and not the second component representation of the second numeric component.

15. The non-transitory computer-readable device of claim 9, wherein at least one of the first display context or the second display context includes at least one of a line chart, a donut bar chart, a comparison chart, or a bar chart.

16. The non-transitory computer-readable device of claim 9, wherein the numeric collection component further includes at least one of a text label, a collection type, a maximum amount of numeric components, or a state of the numeric collection component.

17. The non-transitory computer-readable device of claim 9, wherein the numeric component further includes at least one of a text label, a maximum value, unit type of the numeric value, or a state of the numeric component.

18. A device comprising:
   a memory; and
      one or more processors and/or circuits coupled to the memory and configured to:
      present, via a first rendering component, a first graphical representation of a numeric component in a first display context within a graphical user interface (GUI), the first graphical representation displaying a first attribute associated with a numeric value of the numeric component based on the first display context, wherein the first rendering component is identified as a default component in application code used to render the GUI;
      determine a second display context associated with the numeric component;
      receiving a selection of a second rendering component associated with the second display context into the numeric component;
      update tracking information based on the selection, wherein the tracking information indicates usage patterns between the first rendering component and the second rendering component for the numeric component;
      modify, by the one or more processors, the default component of the application code, to identify the second rendering component, based on the tracking information; and
      present, via the second rendering component, a second graphical representation of the facet component in the second display context within the GUI, wherein the second graphical representation displays a second value associated with the facet component based on the second display context.

19. The device of claim 18, wherein the one or more processors and/or circuits are further configured to:
   determine that the facet component is draggable within the GUI;
   determine that second graphical representation has been relocated to a position of the GUI associated with a facet collection component; and
   present a third graphical representation of the facet component within the facet collection component based on a third display context of the facet collection component.

20. The device of claim 18, wherein the first value and the second value are numeric values, and the facet component includes the facet component further includes at least one of a text label, a numeric value, a maximum value, unit type of the numeric value, or a state of the facet component.

* * * * *